(12) United States Patent
Morita et al.

(10) Patent No.: US 11,456,096 B2
(45) Date of Patent: *Sep. 27, 2022

(54) FERRITE SINTERED MAGNET

(71) Applicant: TDK Corporation, Tokyo (JP)

(72) Inventors: Hiroyuki Morita, Tokyo (JP);
Masanori Ikeda, Tokyo (JP);
Yoshitaka Murakawa, Tokyo (JP);
Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 906 days.

This patent is subject to a terminal disclaimer.

(21) Appl. No.: 16/267,400

(22) Filed: Feb. 5, 2019

(65) Prior Publication Data

US 2019/0304641 A1 Oct. 3, 2019

(30) Foreign Application Priority Data

Mar. 28, 2018 (JP) .............................. JP2018-062087

(51) Int. Cl.
| | | |
|---|---|---|
| *H01F 1/10* | (2006.01) | |
| *H01F 1/11* | (2006.01) | |
| *C01G 49/00* | (2006.01) | |
| *C04B 35/26* | (2006.01) | |

(52) U.S. Cl.
CPC ............ *H01F 1/10* (2013.01); *C04B 35/2633* (2013.01); *C04B 35/2641* (2013.01); *C04B 2235/3274* (2013.01); *C04B 2235/767* (2013.01)

(58) Field of Classification Search
CPC ......... H01F 1/10; H01F 1/11; C04B 35/2633; C04B 35/2641; C04B 35/6281; C04B 35/62685; C04B 2235/767; C04B 2235/3274; C04B 2235/3208; C04B 2235/3213; C04B 2235/3217; C04B 2235/3227; C04B 2235/3277; C04B 2235/3409; C04B 2235/3418; C01G 49/0036; C01G 49/0054; C01P 2002/52; C01P 2004/84

See application file for complete search history.

(56) References Cited

U.S. PATENT DOCUMENTS

| | | | | |
|---|---|---|---|---|
| 4,740,443 | A | * | 4/1988 | Nakahara ........... G03G 9/09385 430/108.7 |
| 6,248,253 | B1 | | 6/2001 | Taguchi et al. |
| 2012/0280167 | A1 | | 11/2012 | Yanagida et al. |
| 2014/0097378 | A1 | | 4/2014 | Yanagida et al. |
| 2015/0262741 | A1 | * | 9/2015 | Oda ..................... C04B 35/6262 264/611 |

FOREIGN PATENT DOCUMENTS

| | | |
|---|---|---|
| CN | 102666431 A | 9/2012 |
| JP | 3263694 B2 | 3/2002 |
| JP | 2011-213575 A | 10/2011 |
| JP | 2012-209295 A | 10/2012 |

* cited by examiner

*Primary Examiner* — Matthew E. Hoban
*Assistant Examiner* — Lynne Edmondson
(74) *Attorney, Agent, or Firm* — Faegre Drinker Biddle & Reath LLP

(57) ABSTRACT

There is provided a ferrite sintered magnet having a high residual magnetic flux density.
A ferrite sintered magnet 2 includes a plurality of main phase particles 5 including ferrite having a hexagonal structure, the number of core-shell structured particles 5A having a core 7 and a shell 9 covering the core 7, among the main phase particles 5, is smaller than the number of the main phase particles 5 other than the core-shell structured particles 5A.

9 Claims, 6 Drawing Sheets

FERRITE SINTERED MAGNET

TECHNICAL FIELD

The present invention relates to a ferrite sintered magnet.

BACKGROUND

As a permanent magnet formed from an oxide, a ferrite sintered magnet such as hexagonal magnetoplumbite type (M type) Sr-ferrite or Ba-ferrite is known (see Japanese Patent No. 3263694 below). In general, a residual magnetic flux density (Br) and a coercive force (HcJ) are used as indicators for evaluating the magnetic characteristics of the permanent magnet, and there is a need for a ferrite sintered, magnet having high Br and HcJ.

SUMMARY

Japanese Patent No. 3263694 discloses that when a high concentration of La or Co is present in the vicinity of grain boundary, rather than in the vicinity of the center of main phase particles constituting a ferrite sintered magnet, a magnetic phase having a high anisotropy is present near the grain boundary, whereby it is easy to obtain excellent magnetic characteristics of the ferrite sintered magnet. However, the present inventors have found that main phase particles having different compositions in the vicinity of the center of crystal particles and in the vicinity of the grain boundary may impair the magnetic characteristics of the entire ferrite sintered magnet, and have completed the present invention as described below.

An object of the present invention is to provide a ferrite sintered magnet having a high residual magnetic flux density.

A ferrite sintered magnet according to one aspect of the present invention is a ferrite sintered magnet including a plurality of main phase particles including ferrite having a hexagonal structure, where the number of core-shell structured particles having a core and a shell covering the core, among the main phase particles, is smaller than the number of the main phase particles other than the core-shell structured particles.

The unit of the content of Sr may be at. % (atom %), and the content of Sr in the core may be higher than the content of Sr in the shell.

The unit of the content of Ca may be at. %, and the content of Ca in the shell may be higher than the content of Ca in the core.

The unit of the content of Sr may be at. %, the unit of the content of Ca may be at. %, and the content of Sr in the core may be higher than the content of Ca in the core.

The unit of the content of Sr may be at. %, the unit of the content of Ca may be at. %, and the content of Ca in the shell may be higher than the content of Sr in the shell.

At least a part of the metal component included in the ferrite sintered magnet may be represented by Formula (1) below $$Ca_{1-w-x-y}R_wSr_xBa_yFe_zCo_m \quad (1),$$

where R in the Formula (1) may be at least one element selected from the group consisting of rare earth elements and Bi, R may contain at least La, w, x, y, z, and m in the Formula (1) may satisfy Formulae (2), (3), (4), (5), (6), (7), (8), and (9) below:

$$0.25 < w < 0.5 \quad (2);$$

$$0.01 < x < 0.35 \quad (3);$$

$$0 \le y < 0.013 \quad (4);$$

$$y < x \quad (5);$$

$$8.5 < z < 9.9 \quad (6);$$

$$1.0 < w/m < 2.1 \quad (7);$$

$$0.017 < m/z < 0.055 \quad (8); \text{ and}$$

$$<1-w-x-y<1 \quad (9), \text{ and}$$

the ferrite sintered magnet may contain an Si component.

In the Formula (1), w, x, and m may satisfy Formulae (2a), (3a), and (10) below:

$$0.350 < w < 0.420 \quad (2a);$$

$$0.120 < x < 0.180 \quad (3a); \text{ and}$$

$$0.200 < m < 0.280 \quad (10), \text{ and}$$

the content of B in the ferrite sintered magnet may be 0.037 to 0.181 mass % in terms of $H_3BO_3$.

The content of Al in the ferrite sintered magnet may be 0.05 to 0.3 mass % in terms of $Al_2O_3$.

According to the present invention, there is provided a ferrite sintered magnet having a high residual magnetic flux density.

DETAILED DESCRIPTION

Figure 1A:
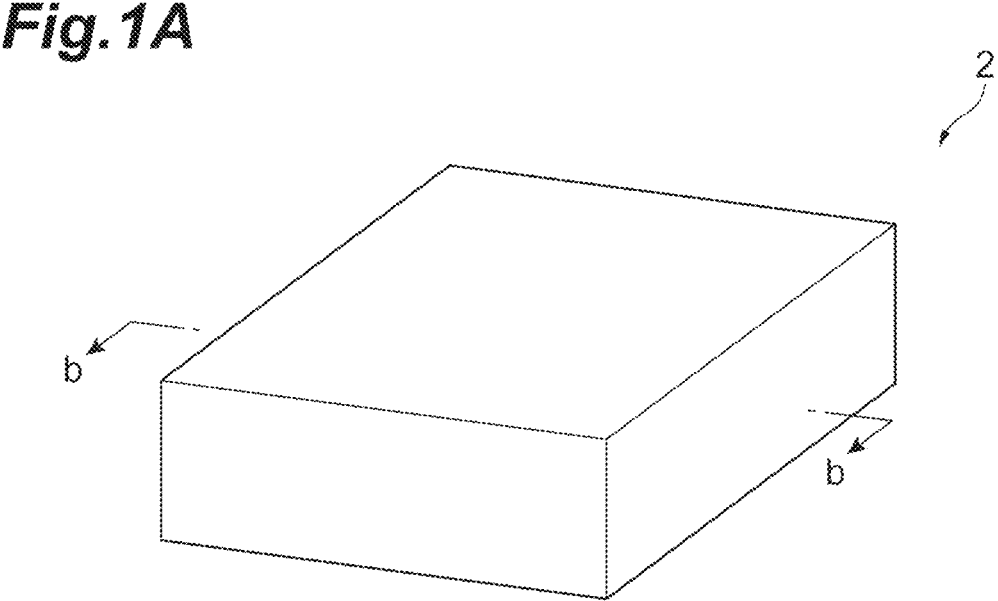
FIG. 1A is a schematic perspective diagram of a ferrite sintered magnet according to one embodiment of the present invention.

Hereinafter, preferred embodiments of the present invention will be described with reference to the drawings. In the drawings, the same elements are denoted by the same reference numerals, and a repeated explanation thereof will not be given. The present invention is not limited to the following embodiments.

(Ferrite Sintered Magnet)

Figure 1B:
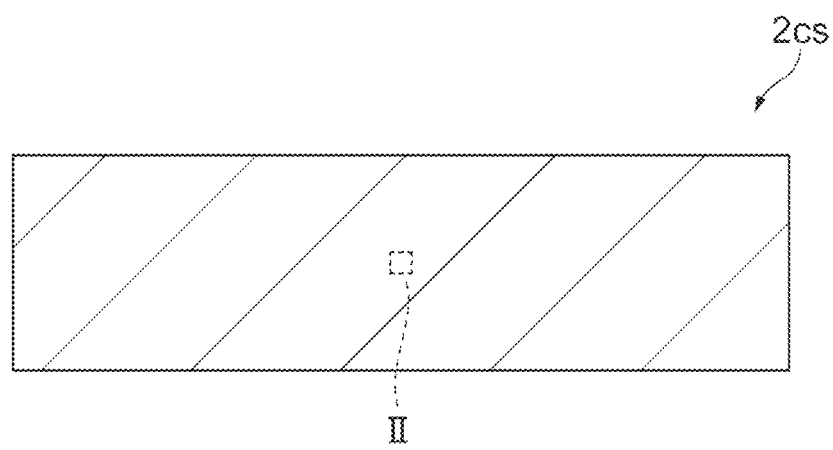
FIG. 1B is a schematic diagram of a cross section of the ferrite sintered magnet shown in FIG. 1A (viewed in the direction of arrow b-b)
Figure 2:
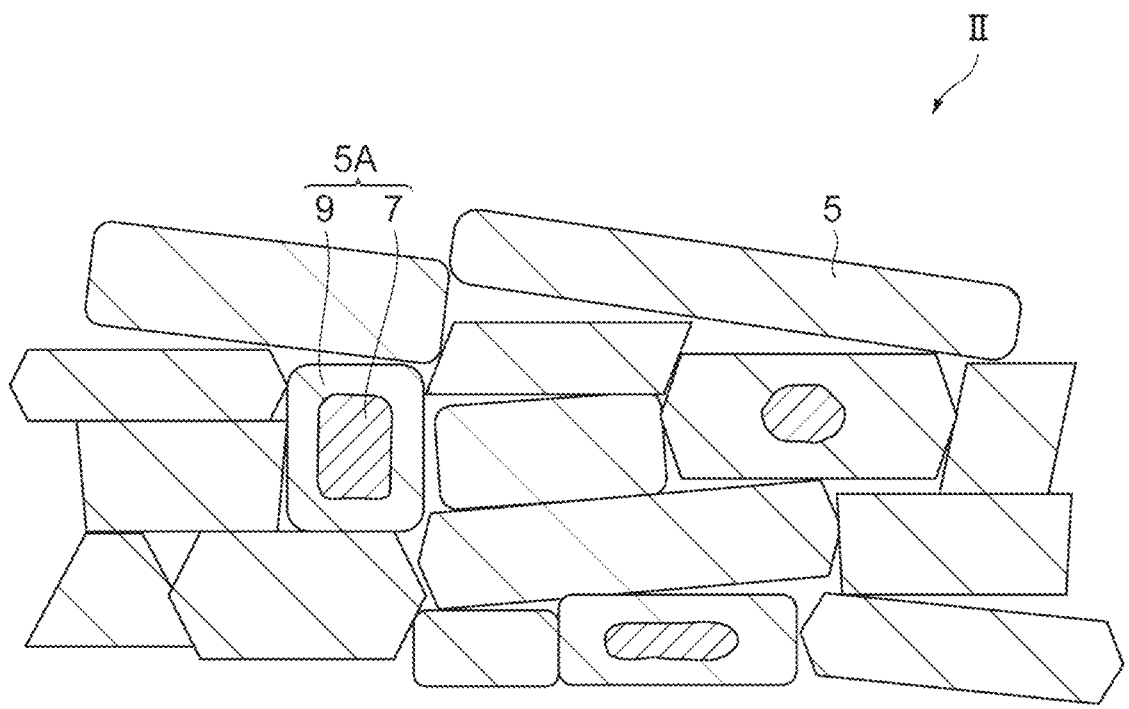
FIG. 2 is a schematic enlarged diagram of a part (region of the cross section of the ferrite sintered magnet shown in FIG. 1B.

FIG. 1A is a schematic perspective diagram of a rectangular parallelepiped-shaped ferrite sintered magnet 2 (ferrite permanent magnet) according to this embodiment, FIG. 1B is a pattern diagram of a cross section 2cs of the ferrite sintered magnet 2, and FIG. 2 is an enlarged diagram of a part (region II) of the cross section 2cs of the ferrite sintered magnet 2. The shape of the ferrite sintered magnet 2 is not limited to a rectangular parallelepiped. For example, the shape of the ferrite sintered magnet 2 may be one selected from the group consisting of an arc segment shape, a C shape, a tile shape, a flat plate shape, a cylinder shape, and an arcuate shape.

As shown in FIG. 2, the ferrite sintered magnet 2 includes a plurality of main phase particles 5 (crystal particles) containing ferrite having a hexagonal structure. The ferrite sintered magnet 2 includes the plurality of main phase particles 5 and a grain boundary phase located between the main phase particles 5. Since the magnetic characteristics of the ferrite sintered magnet 2 are likely to be improved, the ratio of the volume of the main phase particles 5 in the ferrite sintered magnet 2 may be, for example, 90 vol % or more and less than 100 vol %, or 95 vol % or more and less than 100 vol %.

The main phase particle 5 may be crystalline. The main phase particle 5 may include magnetoplumbite type (M type) ferrite having a hexagonal structure as a main phase (ferrite phase). At least a part of the metal component included in the ferrite sintered magnet 2 (main phase particle 5) may be represented by Formula (1) below. In other words, at least a part of the metal component constituting the magnetoplumbite type ferrite (main phase) may be represented by Formula (1) below:

$$Ca_{1-w-x-y}R_wSr_xBa_yFe_zCo_m \quad (1)$$

R in the Formula (1) is at least one element selected from the group consisting of rare earth elements and Bi, and R includes at least La. The rare earth element may be at least one element selected from the group consisting of Sc, Y, La, Ce, Pr, Nd, Pm, Sm, Eu, Gd, Tb, Dy, Ho, Er, Tm, Yb, and Lu. When the ferrite sintered magnet 2 includes only La as R, an anisotropic magnetic field tends to be formed in the ferrite sintered magnet 2, and the magnetic characteristics of the ferrite sintered magnet 2 are likely to be improved.

In addition to the metal component represented by the Formula (1) above, the ferrite sintered magnet 2 may contain at least one element selected from the group consisting of Mn, Mg, Ni, Cu, and Zn. When the ferrite sintered magnet 2 contains at least one selected from the group consisting of Mn, Ni, and Zn as well as Co, the magnetic characteristics of the ferrite sintered magnet 2 are more likely to be improved. When the ferrite sintered magnet 2 includes only Co as M, an anisotropic magnetic field is likely to be formed in the ferrite sintered magnet 2, and particularly the magnetic characteristics of the ferrite sintered magnet 2 are likely improved.

The atomic ratios (molar ratios) w, x, y, z, and m in the Formula (1) may satisfy Formulae (2), (3), (4), (5), (6), (7), (8), and (9) below:

$$0.25 < w < 0.5 \quad (2)$$

$$0.01 < x < 0.35 \quad (3)$$

$$0 \leq y < 0.013 \quad (4)$$

$$y < x \quad (5)$$

$$8.5 < z < 9.9 \quad (6)$$

$$1.0 < w/m < 2.1 \quad (7)$$

$$0.017 < m/z < 0.055 \quad (8)$$

$$0 < 1-w-x-y < 1 \quad (9).$$

The magnetoplumbite type ferrite included in the main phase particle 5 is an oxide of the metal component represented by the Formula (1). For example, the magnetoplumbite type ferrite may be represented by Formula (1a) below. However, the molar ratio of O in Formula (1a) below is not limited to 19. As long as the hexagonal structure of the magnetoplumbite type ferrite is satisfied, the atomic ratio (molar ratio) of O may be a value other than 19. That is, in a part of the ferrite sintered magnet 2 or the main phase particle 5, the atomic ratio (molar ratio) of O may vary in the vicinity of 19.

$$Ca_{1-w-x-y}R_wSr_xBa_yFe_zCo_mO_{19} \quad (1a)$$

The ferrite sintered magnet 2 contains at least an Si component as a sub-component other than the above main phase.

The metal component included in the ferrite sintered magnet 2 (main phase particle 5) is represented by Formula (1) above and the ferrite sintered magnet 2 contains the Si component, whereby Br and HcJ of the ferrite sintered magnet 2 are likely to increase and Hk/HcJ of the ferrite sintered magnet 2 is likely to be 1. The relationship between the magnetic characteristics of the ferrite sintered magnet 2 and Formulae (2), (3), (4), (5), (6), (7), (8), and (9) above will be described hereinafter.

As shown in FIG. 2, among the plurality of main phase particles 5 included in the ferrite sintered magnet 2, some of the main phase particles 5 may be core-shell structured particles 5A having a core 7 and a shell 9 covering the core 7. Only a part of the surface of the core 7 may be covered with the shell 9. In other words, the other part of the surface of the core 7 may be in contact with the grain boundary phase without being covered with the shell 9. The entire core 7 may be covered with the shell 9. The core-shell structured particle 5A may include a plurality of the cores 7.

Figure 3A:
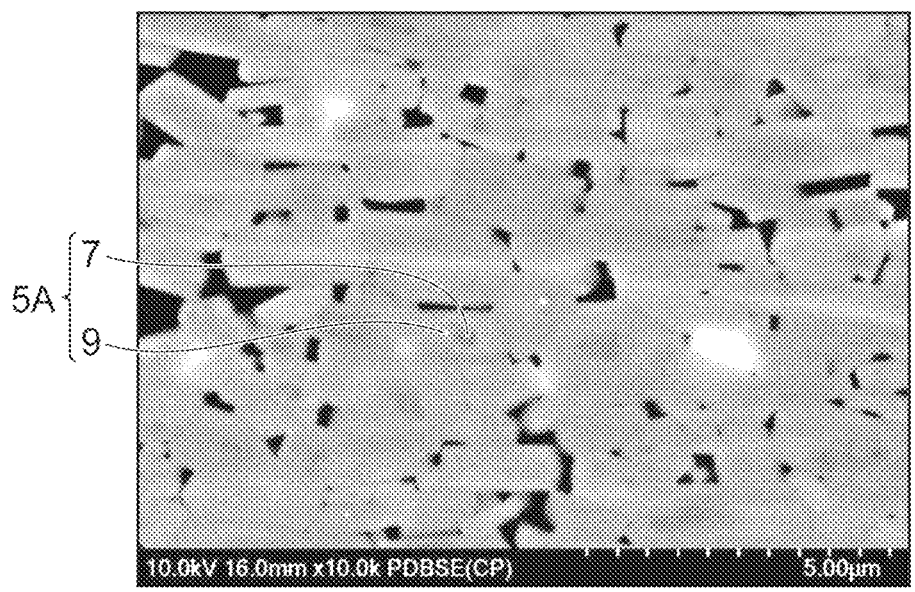
FIG. 3A is an image of a part of a cross section of a ferrite sintered magnet of Example 1 of the present invention (cross section taken by a scanning electron microscope)

It is possible to distinguish between the core-shell structured particle 5A and the main phase particle 5 other than the core-shell structured particle 5A in the image of the cross section 2cs of the ferrite sintered magnet 2 taken by the scanning electron microscope (SEM). For example, as shown in FIG. 3A, in the cross section of the ferrite sintered magnet 2 taken by SEM, the color of the core 7 is darker than the color of the shell 9 surrounding the core 7. That is, the core 7 and the shell 9 are observed in the cross section of the core-shell structured particle 5A taken by SEM and clearly distinguished by the shade of color. The shade of color between the core 7 and the shell 9 is due to the difference in composition between the core 7 and the shell 9. Meanwhile, the color of the cross section of the main phase particle 5 other than the core-shell structured particle 5A is approximately uniform. In other words, the composition of the inside of the main phase particle 5 other than the core-shell structured particle 5A may be approximately uniform. There may be a gradient or irregularity in the concentration of at least one element selected from the group consisting of Ca, R, Sr, Ba, Fe, and M, in the inside of the main phase particle other than the core-shell structured particle 5A.

Among the main phase particles 5 included in the ferrite sintered magnet 2, the number of the core-shell structured particles 5A is smaller than the number of the main phase particles 5 other than the core-shell structured particles 5A. For example, the total number of the core-shell structured particles 5A (among all the main phase particles 5 included in the ferrite sintered magnet 2) may be smaller than the total number of the main phase particles 5 other than the core-shell structured particles 5A. In other words, the ratio of the number of the core-shell structured particles 5A to the main phase particles 5 included in the ferrite sintered magnet 2 is less than 50%.

Conventionally, it has been known that when a high concentration of La or Co is present in the vicinity of grain boundary, rather than in the vicinity of the center of main phase particles, a magnetic phase having a high anisotropy is present near the grain boundary, whereby it is easy to obtain excellent magnetic characteristics of the ferrite sintered magnet. Contrary to such conventional knowledge, the present inventors have found out that, when the metal component included in the ferrite sintered magnet (main phase particle) is represented by the Formula (1), the composition in the vicinity of the center of main phase particles is different from the composition in the vicinity of the grain boundary, whereby the magnetic characteristics of the entire ferrite sintered magnet may be impaired. Then, the present inventors have found out that when the number of the core-shell structured particles 5A is less than 50% of the total number of the main phase particles 5, the ratio of the main phase particles 5 having an approximately uniform content (concentration) of each of La, Co, and Ca in the particles is increased, and as a result, Br and HcJ of the ferrite sintered magnet 2 are likely to increase.

Since both Br and HcJ of the ferrite sintered magnet 2 are likely to increase, the ratio of the number of the core-shell structured particles 5A to the total number of the main phase particles 5 is 45% or less, 40% or less, 35% or less, 30% or less, 25% or less, 21.4% or less, 20% or less, 15% or less, 14.3% or less, 10% or less, 5% or less, or 1% or less. As the ratio of the number of the core-shell structured particles 5A to the total number of the main phase particles 5 is smaller, both Br and HcJ of the ferrite sintered magnet 2 are likely to increase. The ratio of the number of the core-shell structured particles 5A may be 0% or more. The ferrite sintered magnet 2 may not include the core-shell structured particles 5A.

The ratio of the number of the core-shell structured particles 5A may be calculated from the number of the main phase particles 5 and the number of the core-shell structured particles 5A, which are observed in a region randomly selected from the cross section of the ferrite sintered magnet 2 (field of view of the scanning electron microscope). The ratio of the core-shell structured particles 5A may be calculated from the number of the core-shell structured particles 5A included in the total number (50 or more) of randomly selected main phase particles 5.

The core 7 may contain La, Sr, Co, and Ca. The shell 9 may also contain La, Sr, Co, and Ca. When the unit of the content of Sr or Ca is at. %, the content of Sr in the core 7 tends to be higher than the content of Sr in the shell 9. The content of Ca in the shell 9 tends to be higher than the content of Ca in the core 7. The content of Sr in the core 7 tends to be higher than the content of Ca in the core 7. The content of Ca in the shell 9 tends to be higher than the content of Sr in the shell 9. The ratio of the number of the core-shell structured particles 5A having the above tendency is decreased by the content of Sr and the content of Ca in each of the core 7 and the shell 9, whereby both Br and HcJ of the ferrite sintered magnet 2 are likely to increase.

The distribution of the content of Sr in the core 7 may be uniform and may have a gradient. The distribution of the content of Sr in the shell 9 may be uniform and may have a gradient. The distribution of the content of Ca in the core 7 may be uniform and may have a gradient. The distribution of the content of Ca in the shell 9 may be uniform and may have a gradient.

The average particle sizes of the main phase particle 5 and the core-shell structured particle 5A are preferably 1.5 μm or less, more preferably 1.0 μm or less, and still more preferably 0.5 to 1.0 μm. When the main phase particle 5 and the core-shell structured particle 5A have the above average particle sizes, HcJ of the ferrite sintered magnet 2 is likely to increase. The average particle sizes of the main phase particle 5 and the core-shell structured particle 5A may be measured by observing the cross section 2cs of the ferrite sintered magnet 2 with a scanning electron microscope. The thickness of the shell 9 of the core-shell structured particle 5A is not limited as long as the thickness is less than the particle size of the core-shell structured particle 5A. The maximum diameter of the core 7 of the core-shell structured particle 5A is not limited as long as the thickness is less than the particle size of the core-shell structured particle 5A.

The atomic ratio of Ca (1-w-x-y) may be greater than 0.05 and less than 0.59. When the atomic ratio of Ca is too small, the crystal structure (hexagonal structure) of the M type ferrite is unlikely to be formed. Meanwhile, when the atomic ratio of Ca is too small, the ratio of $\alpha$-$Fe_2O_3$ (i.e., a non-magnetic phase in the ferrite sintered magnet 2) is likely to increase, and R becomes excessive, whereby a different non-magnetic phase such as orthoferrite is likely to be formed. As a result, when the atomic ratio of Ca is too small, the magnetic characteristics (particularly Br and HcJ) of the ferrite sintered magnet 2 are likely to decrease. Meanwhile, when the atomic ratio of Ca is too large, the crystal structure (hexagonal structure) of the M type ferrite is unlikely to be formed. Further, when the atomic ratio of Ca is too large, the ratio of the non-magnetic phase (such as $CaFeO_{3-x}$) in the ferrite sintered magnet 2 is likely to increase, and the magnetic characteristics of the ferrite sintered magnet 2 are likely to deteriorate.

When an atomic ratio (w) of R satisfies $0.25<w<0.5$, Br and HcJ are likely to increase and Hk/HcJ is likely to be 1. Hk is a magnetic field corresponding to 90% of Br. When the atomic ratio of R is too small, a solid solution of M is unlikely to be formed in the ferrite sintered magnet 2, and Br and HcJ tend to decrease. Meanwhile, when the atomic ratio of R is too large, a different non-magnetic phase such as orthoferrite is likely to be formed in the ferrite sintered magnet 2, and Hk/HcJ is likely to decrease.

When an atomic ratio (x) of Sr satisfies $0.01<x<0.35$, Br and HcJ are likely to increase and Hk/HcJ is likely to be 1. When the atomic ratio of Sr is too small, the atomic ratio of Ca and/or La becomes relatively large and Hk/HcJ is likely to decrease. On the other hand, when the atomic ratio of Sr is too large, Br and HcJ are likely to decrease.

An atomic ratio (y) of Ba may satisfy $0.0002<y<0.011$. Since the atomic ratio (y) of Ba satisfies $0.0002<y<0.011$, Br and HcJ are likely to increase and Hk/HcJ is likely to be 1. When the atomic ratio of Ba is too small, Hk/HcJ is unlikely to be 1. However, even if the atomic ratio of Ba is zero, the effect of the present invention can be obtained. Meanwhile, when the atomic ratio of Ba is too large, Br and HcJ are likely to decrease. From such a viewpoint, the atomic ratio (y) of Ba may satisfy $0.0006 \leq y \leq 0.010$.

The atomic ratio (x) of Sr and the atomic ratio (y) of Ba satisfy y<x. Since the atomic ratio of Sr is larger than the atomic ratio of Ba, Br is likely to increase and Hk/HcJ is likely to be 1.

An atomic ratio (z) of Fe satisfies 8.5<z<9.9, whereby Br and HcJ are likely to increase and Hk/HcJ is likely to be 1. When the atomic ratio of Fe is too small, Br and HcJ are likely to decrease. Even when the atomic ratio of Fe is too large, Br and HcJ are likely to decrease.

w/m satisfies 1.0<w/m<2.1 and m/z satisfies 0.017<m/z<0.055, whereby Br and HcJ are likely to increase and Hk/HcJ is likely to be 1. When an atomic ratio (m) of M is too small, Br and HcJ are likely to decrease. Particularly, when the ratio of Co is too small, HcJ is likely to decrease. Meanwhile, even when the ratio of M is too large, Br and HcJ are likely to decrease. From these viewpoints, w/m may satisfy 1.2≤w/m≤2.0 or 1.5≤w/m≤1.8, and m/z may satisfy 0.02≤m/z≤0.05 or 0.022≤m/z≤0.04.

The Si component included as the sub-component in the ferrite sintered magnet 2 may serve as a sintering aid for promoting sintering between the main phase particles 5 in the manufacturing process of the ferrite sintered magnet 2. Hence, the Si component is used as the raw material of the main phase particles 5, whereby the main phase particles 5 are likely to be sintered together in the manufacturing process (sintering step) of the main phase particles 5, the crystal grain size of the main phase particles 5 is appropriately adjusted. Thus, the magnetic characteristics of the ferrite sintered magnet 2 are easily controlled. As a result, Br and HcJ of the ferrite sintered magnet 2 are likely to increase, and Hk/HcJ is likely to be 1. When the content of the Si component in the ferrite sintered magnet 2 is converted into the content of $SiO_2$, the content of the Si component may be 0.1 to 3 mass parts with respect to 100 mass parts of the main phase. When the content of the Si component is within the above range, HcJ of the ferrite sintered magnet 2 is likely to increase. The composition of the Si component is not particularly limited. For example, the Si component may be added (as $SiO_2$, $Na_2SiO_3$, $SiO_2 \cdot nH_2O$ or the like) to the raw material of the main phase of the ferrite sintered magnet 2.

In the Formula (1), w, x, z, and m may satisfy Formulae (2a), (3a), (4a), and (10) below, and the content of B in the ferrite sintered magnet 2 may be 0.037 to 0.181 mass % in terms of $H_3BO_3$.

$$0.350<w<0.420, \text{ preferably } 0.360 \leq w \leq 0.420 \quad (2a)$$

$$0.120<x<0.180, \text{ preferably } 0.110 \leq x \leq 0.173 \quad (3a)$$

$$8.51 \leq z \leq 9.71 \quad (4a)$$

$$0.200<m<0.280, \text{ preferably } 0.208 \leq m \leq 0.269 \quad (10)$$

When the atomic ratio (w) of R satisfies the Formula (2a), the atomic ratio (x) of Sr satisfies the Formula (3a), the atomic ratio (z) of Fe satisfies the Formula (4a), and the atomic ratio (m) of Co satisfies the Formula (10), Br and HcJ are likely to increase and Hk/HcJ is likely to be 1. When m exceeds 0.200, particularly HcJ is likely to increase.

When w, x, z, and m in the Formula (1) satisfy Formulae (2a), (3a), (4a), and (10), the content of Al in the ferrite sintered magnet 2 is 0.05 to 0.3 mass % or 0.03 to 0.3 mass % in terms of $Al_2O_3$. The content of Al is 0.05 mass % or more or 0.03 mass % or more, whereby the grain growth is suppressed during calcining the raw material powder of the ferrite sintered magnet, and the coercive force of the obtained ferrite sintered magnet 2 is likely to increase. Since the content of Al is 0.3 mass % or less, Br and HcJ are likely to increase.

When w, x, z, and m in the Formula (1) satisfy Formulae (2a), (3a), (4a), and (10), the content of Ba in the ferrite sintered magnet 2 may be 0.001 to 0.077 mass % or 0.001 to 0.068 mass % in terms of BaO.

The ferrite sintered magnet 2 may further include Cr, Ga, Mg, Cu, Mn, Ni, Zn, In, Li, Ti, Zr, Ge, Sn, V, Nb, Ta, Sb, As, W, and Mo. The content of each of the elements is preferably 3 mass % or less, and more preferably 1 mass % or less in terms of oxide. From the viewpoint of avoiding the degradation of magnetic characteristics, the total content of these elements is preferably 2 mass % or less.

It is preferable that the ferrite sintered magnet 2 does not include an alkali metal element (such as Na, K or Rb) as a sub-component. The alkali metal element tends to reduce the saturation magnetization of the ferrite sintered magnet 2. However, the alkali metal element may be included, for example, in the raw material for obtaining the ferrite sintered magnet 2. Thus, the alkali metal element may be included in the ferrite sintered magnet 2 as long as the amount is an inevitably included amount. The content of the alkali metal element which does not significantly affect the magnetic characteristics is 3 mass % or less.

The sub-component may be included in at least the grain boundary phase of the main phase particle 5 (main phase particle) and the grain boundary phase. The sub-component may be included in both the main phase particle 5 (main phase particle) and the grain boundary phase.

The composition of the entire ferrite sintered magnet 2 may be identified by, for example, fluorescent X-ray (XRF) analysis. The presence and crystal structure of the main phase (M type ferrite) may be identified by X-ray diffraction or electron beam diffraction.

(Manufacturing Method of Ferrite Sintered Magnet)

The manufacturing method of the ferrite sintered magnet according to the present embodiment may include a mixing step, a calcining step, a pulverizing step, a molding step, and a sintering step. Each of the steps will be described hereinafter.

<Mixing Step>

In the mixing step, raw materials of the ferrite sintered magnet are mixed to form a raw material composition. As for a raw material of ferrite sintered magnet, a compound (raw material compound) including one or two or more elements constituting the raw material is exemplified. The raw material is preferably in the form of powder. As the raw material compound, an oxide of each element or a compound which converts into an oxide after sintering (such as carbonate, hydroxide or nitrate) is exemplified. The raw material of the main phase (raw material compound) may be, for example, $SrCO_3$, $La(OH)_3$, $Fe_2O_3$, $BaCO_3$, $CaCO_3$, $CO_3O_4$, $H_3BO_3$, $Al_2O_3$, or $SiO_2$. If necessary, another sub-component (an element alone, an oxide, or the like) may be added to the raw material of the main phase. The average particle size of the powder of the raw material compound may be, for example, about 0.1 to 2.0 μm from the viewpoint of allowing for uniform mixing.

For example, raw materials are weighed so as to approximately match the composition of the metal component represented by the Formula (1) above. After mixing the raw materials, the mixture of the raw materials may be further mixed and pulverized for about 0.1 to 20 hours using a wet attritor, a ball mill or the like.

In order to reduce the number of the core-shell structured particles included in the ferrite sintered magnet, it is preferable to mix the total amount of raw materials including Ca, R, Sr, Fe, and M which constitute the metal component (main phase) represented by Formula (1) above before the calcining step. When the raw materials of the main phase are further added to the calcined body obtained in the calcining step, both the calcined body and the raw materials are heated in the sintering step. As a result, a difference in concentration (concentration gradient) among the elements constituting the metal component occurs between the vicinity of the surface of the main phase particle and the central portion. Accordingly, the core-shell structured particles are likely to be formed.

In this regard, in the mixing step, it is not necessary to mix all the raw materials of the main phase. For the fine adjustment and control of the composition of the ferrite sintered magnet, the raw materials of the main phase may be further added to the calcined body obtained in the calcining step. A sub-component (Si component (e.g., $SiO_2$)) and constituent elements of the main phase (La, Ca, and Co ($La(OH)_3$, $CaCO_3$, and $Co_3O_4$)) may be added to the calcined body in the pulverizing step to be hereinafter described. The timing of the addition may be adjusted in order to easily obtain the desired composition and magnetic characteristics.

<Calcining Step>

In the calcining step, the raw material powder obtained in the mixing step is calcined. A granular or massive calcined body is obtained by the calcining step. Calcination is preferably performed, for example, in an oxidizing atmosphere such as air. The calcining temperature may be 1100 to 1400° C., 1100 to 1300° C., or 1100 to 1250° C. The calcining time may be 1 second to 10 hours, or 1 second to 3 hours. The calcined body obtained by the calcination includes 70% or more of the main phase (M phase) as described above. The primary particle size of the main phase may be 10 μm or less, or 2 μm or less.

<Pulverizing Step>

In the pulverizing step, the calcined body is pulverized and ground to a fine powder again. This step facilitates molding in the molding step. In the pulverizing step, the raw materials of the main phase or the sub-component may be added to the calcined body (post-addition of the raw materials) in order to adjust and control the composition. In the pulverizing step, for example, the calcined body is pulverized to form a coarse powder, and then the coarse powder may be finely pulverized. In other words, the pulverization may be performed in a two-stage step including a coarsely pulverizing step and a finely pulverizing step.

For example, a vibrational mill may be used for coarse pulverization. The average particle size of the powder (coarsely pulverized material) obtained by coarse pulverization of the calcined body may be 0.5 to 5.0 μm. In fine pulverization, the coarsely pulverized material is further pulverized by a wet attritor, a ball mill, a jet mill or the like. The finely pulverized material obtained by pulverization may have an average particle size of about 0.08 to 2.0 μm, about 0.1 to 1.0 μm, or about 0.2 to 0.8 μm. The specific surface area (BET specific surface area) of the finely pulverized material may be about 7 to 12 m²/g. A suitable pulverizing time varies depending on the pulverizing method. For example, in the case of the wet attritor, the pulverizing time may be 30 minutes to 10 hours. The wet pulverizing time with the ball mill may be about 10 to 50 hours.

In the finely pulverizing step, some of the raw materials of the main phase or the sub-component may be added to the calcined body. For example, a Ca component ($CaCO_3$), a La component ($La(OH)_3$), a Co component ($Co_3O_4$) or a Si component ($SiO_2$) may be added to the coarsely pulverized material. In the coarsely pulverizing step before the finely pulverizing step, some of the raw materials may be added to the calcined body.

In the finely pulverizing step, it is preferable to add, for example, a polyhydric alcohol represented by the general formula $C_n(OH)_nH_{n+2}$ to the coarsely pulverized material in order to increase the degree of magnetic orientation of the sintered body obtained after sintering. Here, n in the general formula of the polyhydric alcohol may be 4 to 100, 4 to 30, 4 to 20, or 4 to 12. The polyhydric alcohol is, for example, sorbitol. Two or more kinds of polyhydric alcohols may be used in combination. In addition to the polyhydric alcohol, other known dispersants may be used in combination.

The additive amount of the polyhydric alcohol may be 0.05 to 5.0 mass %, 0.1 to 3.0 mass %, or 0.2 to 2.0 mass % with respect to the object to be added (e.g., coarsely pulverized material). It should be noted that the polyhydric alcohol added in the finely pulverizing step is removed by heat decomposition in the sintering step to be described later.

<Molding Step>

In the molding step, the pulverized material (preferably, the finely pulverized material) obtained in the pulverizing step is molded in a magnetic field to form a molded body. The molding may be performed by either dry molding or wet molding. From the viewpoint of increasing the degree of magnetic orientation, the wet molding is preferred.

In the case of wet molding, for example, the finely pulverizing step is performed by wet molding to form a slurry, and then the slurry is concentrated to a predetermined concentration to form a slurry for wet molding. It is preferable that the molding is performed using the slurry for wet molding. The slurry can be concentrated by centrifugal separation or filter press. The content of finely pulverized material in the slurry for wet molding may be 30 to 80 mass %. In the slurry, water is preferred as a dispersion medium for dispersing the finely pulverized material. In this case, a surfactant such as gluconic acid, gluconate or sorbitol may be added to the slurry. Further, a nonaqueous solvent may be used as the dispersion medium. An organic solvent such as toluene or xylene can be used as the nonaqueous solvent. In this case, it is preferable to add a surfactant such as oleic acid to the nonaqueous solvent. It should be noted that the slurry for wet molding may be prepared by adding the dispersion medium or the like to the dried, finely pulverized material.

In the case of molding the slurry for wet molding in a magnetic field, the molding pressure may be about 9.8 to 49 MPa (0.1 to 0.5 ton/cm²), and the applied magnetic field may be about 398 to 1194 kA/m (5 to 15 kOe).

<Sintering Step>

In the sintering step, the molded body obtained in the molding step is sintered to form a sintered body (ferrite sintered magnet). In the sintering step, the ferrite sintered magnet is formed by sintering the main phase particles (pulverized material) included in the molded body.

The sintering may be performed in an oxidizing atmosphere such as air. The sintering temperature is preferably 1050 to 1270° C., and more preferably 1080 to 1240° C. The sintering time (the time for holding at the sintering temperature) is preferably about 0.5 to 3 hours. The heating rate until the temperature of the sintering atmosphere reaches the sintering temperature is preferably 0.5 to 5° C./min. Upon completion of the sintering step, the cooling rate when the temperature of the sintering atmosphere is decreased from the sintering temperature is preferably 5.0 to 10.0° C./min. When the sintering temperature, the heating rate, and the cooling rate are within the above ranges, the ratio of the number of the core-shell structured particles to the total number of the main phase particles is likely to be reduced to less than 50%. When the sintering temperature is too low, the main phase particles are not sufficiently sintered, and a ferrite sintered magnet having excellent magnetic characteristics is unlikely to be formed. When the sintering temperature is too high, abnormal grain growth occurs and magnetic characteristics are deteriorated. When the heating rate is too low, it takes time to perform the sintering step and the production cost is increased, and thus this is not preferred. When the heating rate is too high, deterioration of magnetic characteristics may be caused, and thus this is not preferred. When the cooling rate is too low, deterioration of magnetic characteristics may be caused, and thus this is not preferred. When the cooling rate is too high, cracks may be formed in the sintered body due to a sudden temperature difference, and thus this is not preferred.

It should be noted that, in the case of producing a molded body by wet molding, when the molded body is sintered without being sufficiently dried, the dispersion medium and the like in the molded body is vigorously volatilized by rapid heating, whereby cracks may be generated in the molded body. From the viewpoint of suppressing cracks, before heating the molded body at the above sintering temperature, the molded body may be sufficiently dried by heating it, for example, in the range of about room temperature to about 100° C. at a heating rate of about 0.5° C./min. When the molded body includes a surfactant (dispersant) or the like, the molded body may be heated, for example, in the range of about 100 to 500° C. at a heating rate of about 2.5° C./min in order to remove the surfactant (dispersant) or the like (degreasing treatment). These heat treatments may be performed at the beginning of the sintering step or may be performed as a separate step prior to the sintering step.

The ferrite sintered magnet according to the present embodiment may be applied, for example, to automotive motors, motors for OA/AV devices, motors for household electric appliances, motors for FA devices, motorcycle generators, speakers, headphone magnets, magnetron tubes, magnetic field generators for MRI, clampers for CD-ROM, distributor sensors, ABS sensors, fuel-oil level sensors, magnet latches, isolators, and sputtering targets.

EXAMPLES

Hereinafter, the present invention will be described in more detail with reference to Examples, but the present invention is not limited to these Examples.

Example 1

(Manufacturing of Ferrite Sintered Magnet)

As raw materials of the main phase of the ferrite sintered magnet, iron oxide ($Fe_2O_3$), calcium carbonate ($CaCO_3$), strontium carbonate ($SrCO_3$), cobalt oxide ($Co_3O_4$), barium carbonate ($BaCO_3$), and lanthanum hydroxide ($La(OH)_3$) were provided. Each of the raw materials was weighed so that the composition of the metal component included in the ferrite sintered magnet (main phase) was the composition represented by Formula (1c) below. In other words, the above raw materials were weighed so that the values of 1-w-x-y, w, x, y, z, and m in Formula (1c) below were the values shown in Table 1 below. Silicon oxide ($SiO_2$) was provided as the Si component (sub-component). The ratio (unit:mass part) of $SiO_2$ to the total mass (100 mass parts) of all the raw materials of the main phase was adjusted to the values shown in Table 1 below.

The raw materials were mixed and pulverized with a wet attritor, and then the mixture of the raw materials was dried to form a raw material powder.

$$Ca_{1-w-x-y}La_wSr_xBa_yFe_zCo_m \quad (1c)$$

<Calcining and Pulverizing Step>

In the calcining step, the raw material powder was heated in the air at 1200° C. for 2 hours to form a calcined body. In the pulverizing step, the calcined body was pulverized with a small rod vibrational mill to form a coarsely pulverized material. In order to more precisely adjust the composition of the metal component included in the coarsely pulverized material to the composition represented by Formula (1c) above, $CaCO_3$, $La(OH)_3$, $Co_3O_4$, $SiO_2$, and $Fe_2O_3$ were added to the coarsely pulverized material. Namely, post-addition of the raw materials of the main phase was performed in the pulverizing step. Subsequently, the coarsely pulverized material was further pulverized with a wet ball mill for 32 hours to form a slurry including finely pulverized particles of the calcined body. The slurry was dehydrated by a centrifugal separator in order to adjust the concentration of the solid content (finely pulverized particles of the calcined body), thereby obtaining a slurry for wet molding.

<Molding and Sintering Step>

In the molding step, a slurry for wet molding was molded in a magnetic field of 10 kOe using a wet magnetic field molding machine to form a cylindrical molded body. The resulting molded body was sufficiently dried at room temperature in the air. In the sintering step, the molded body was placed in a furnace filled with the air. Then, the inside of the furnace was heated, and the temperature in the furnace was increased from room temperature to the sintering temperature shown in Table 2. The heating rate from the room temperature to the sintering temperature in the furnace was adjusted to the value shown in Table 2 below. Then, the molded body was heated at the sintering temperature shown in Table 2 below for 1 hour. Thereafter, the inside of the furnace was cooled, and the temperature in the furnace was lowered from the sintering temperature to room temperature. The cooling rate until the temperature in the furnace reached from the sintering temperature to room temperature was adjusted to the value shown in Table 2 below.

Thus, the ferrite sintered magnet of Example 1 was produced by the above steps.

(Measurement of Magnetic Characteristics)

After processing the upper and lower surfaces of the cylindrical ferrite sintered magnet, the residual magnetic flux density Br (mT) and the coercive force HcJ (kA/m) of the ferrite sintered magnet were measured. For the measurement, a B-H tracer with a maximum applied magnetic field of 25 kOe was used. Br and HcJ of Example 1 are shown in Table 2 below.

(Analysis of Composition of Entire Ferrite Sintered Magnet)

The composition of the entire ferrite sintered magnet was analyzed by the XRF method. It was confirmed that the composition of the metal component included in the ferrite sintered magnet of Example 1 is represented by Formula (1c) above, and the values of 1-w-x-y, w, x, y, z, and m are values shown in Table 1 below. Hence, it was confirmed that the composition of the entire ferrite sintered magnet is represented by Formula (1d) below:

$$Ca_{1-w-x-y}La_wSr_xBa_yFe_zCo_mO_{19} \quad (1d)$$

(Analysis of Cross Section of Ferrite Sintered Magnet)

Figure 4:
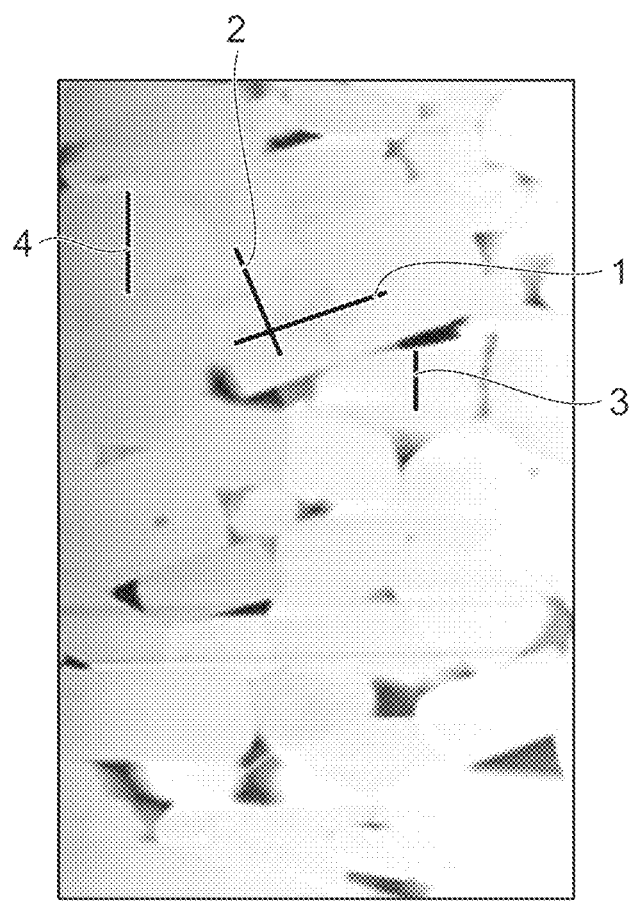
FIG. 4 is an image of a part of the cross section of the ferrite sintered magnet of Example 1 of the present invention (cross section taken by a transmission electron microscope)

The ferrite sintered magnet was cut in a direction perpendicular to the upper and lower surfaces of the cylindrical ferrite sintered magnet. The cross section of the ferrite sintered magnet was observed with a scanning electron microscope and a transmission electron microscope. FIG. 3A shows an image of the cross section of the ferrite sintered magnet of Example 1 taken by the scanning electron microscope. FIG. 4 shows an image of the cross section of the ferrite sintered magnet of Example 1 taken by the transmission electron microscope. As shown in FIG. 3A, it was confirmed that the ferrite sintered magnet included a large number of sintered main phase particles. It was also confirmed that the core-shell structured particles 5A having the core 7 and the shell covering the core 7 were included among a large number of the main phase particles. It was also confirmed that the ferrite sintered magnet included the main phase particles having no core-shell structure. 60 main phase particles in the cross section of the ferrite sintered magnet of Example 1 were randomly selected, and the number of the core-shell structured particles among the 60 main phase particles was counted. The ratio of the number (R-CS) of core-shell structured particles to the total number of main phase particles was calculated. R-CS of Example 1 is shown in Table 2 below.

As shown in FIG. 4, the composition of the inside of the core-shell structured particles was subjected to line analysis along each of the four line segments (line segments 1 to 4) traversing the core-shell structured particles. For line analysis, an energy dispersive X-ray spectroscopy (EDS) analyzer provided in a transmission electron microscope was used. In any of the line analyses along the line segments 1 to 4, the following characteristics 1 to 5 were confirmed.

Characteristic 1: The core included La, Sr, Co, and Ca.
Characteristic 2: The shell included La, Sr, Co, and Ca.
Characteristic 3: The content (unit: at. %) of Sr in the core tended to be higher than the content (unit: at. %) of Sr in the shell.
Characteristic 4: The content (unit: at. %) of Ca in the shell tended to be higher than the content (unit: at. %) of Ca in the core.
Characteristic 5: The content (unit: at. %) of Sr in the core tended to be higher than the content (unit: at. %) of Ca in the core.
Characteristic 6: The content (unit: at. %) of Ca in the shell tended to be higher than the content (unit: at. %) of Sr in the shell.

Example 2

In the case of Example 2, the raw materials of the main phase were weighed so that the values of 1-w-x-y, w, x, y, z, and m in Formula (1c) above were the values shown in Table 1 below. In the case of Example 2, the ratio (unit:mass part) of $SiO_2$ to the total mass (100 mass parts) of the raw materials of the main phase was adjusted to the values shown in Table 1 below. In the case of Example 2, the total amount of each of the raw materials of the main phase was mixed with $H_3BO_3$ and $Al_2O_3$ before the calcining step. Hence, in Example 2, the addition (post-addition) of the raw materials of the main phase to the calcined body was not performed. In the case of Example 2, the heating rate, the sintering temperature, and the cooling rate in the sintering step were adjusted to the values shown in Table 2 below.

Figure 5:
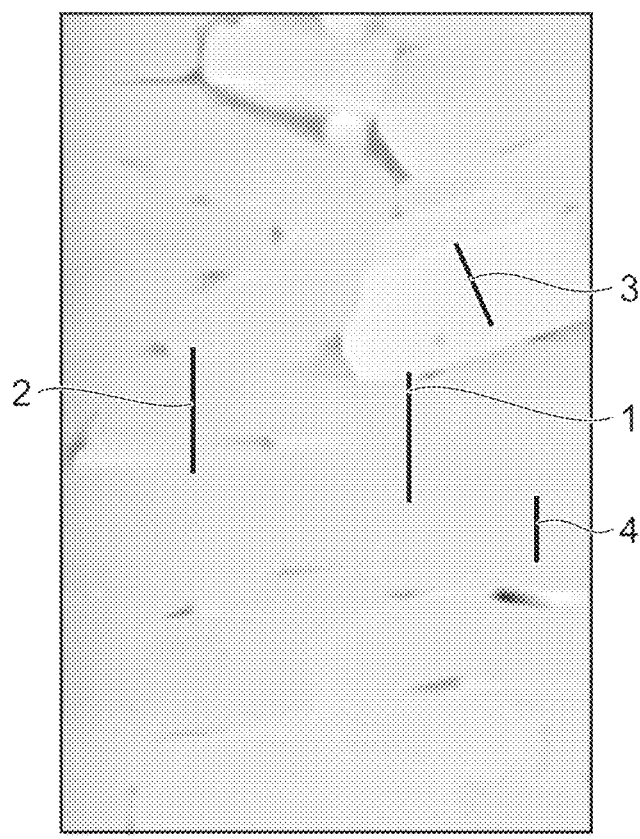
FIG. 5 is an image of a part of a cross section of a ferrite sintered magnet according to Example 2 of the present invention (cross section taken by the transmission electron microscope)

A ferrite sintered magnet of Example 2 was produced in the same manner as in Example 1 except for the above matters. The ferrite sintered magnet of Example 2 was measured and analyzed in the same manner as in Example 1. The results of measurement and analysis of Example 2 are shown in Table 2 below. It was confirmed that the composition of the metal component included in the ferrite sintered magnet of Example 2 is represented by Formula (1c) above, and the values of 1-w-x-y, w, x, y, z, and m are values shown in Table 1 below. It was confirmed that the ferrite sintered magnet of Example 2 included core-shell structured particles. It was also confirmed that the ferrite sintered magnet of Example 2 included a large number of main phase particles having no core-shell structure. The composition of the inside of the core-shell structured particles in Example 2 was subjected to line analysis along each of the line segments 1 to 4 shown in FIG. 5. Also, in the line analysis of Example 2, the above characteristics 1 to 6 were confirmed in the same manner as in Example 1.

Example 3

In the case of Example 3, the raw materials of the main phase were weighed so that the values of 1-w-x-y, w, x, y, z, and m in Formula (1c) above were the values shown in Table 1 below. In the case of Example 3, the ratio (unit:mass part) of $SiO_2$ to the total mass (100 mass parts) of the raw materials of the main phase was adjusted to the values shown in Table 1 below. In the case of Example 3, the total amount of each of the raw materials of the main phase was mixed with $H_3BO_3$ and $Al_2O_3$ before the calcining step. Hence, in Example 3, the addition (post-addition) of the raw materials of the main phase to the calcined body was not performed. In the case of Example 3, the heating rate, the sintering temperature, and the cooling rate in the sintering step were adjusted to the values shown in Table 2 below.

Figure 6:
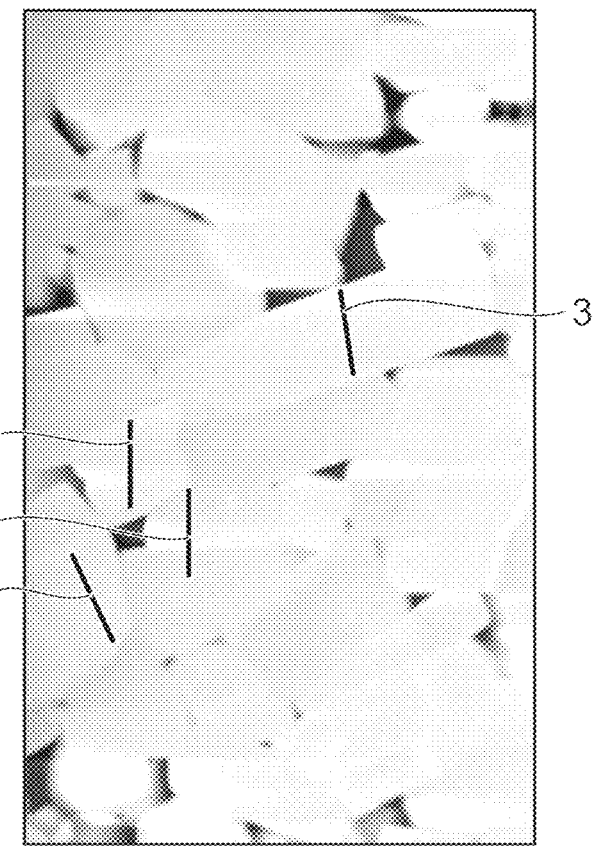
FIG. 6 is an image of a part of a cross section of a ferrite sintered magnet of Example 3 of the present invention (cross section taken by the transmission electron microscope).

A ferrite sintered magnet of Example 3 was produced in the same manner as in Example 1 except for the above matters. The ferrite sintered magnet of Example 3 was measured and analyzed in the same manner as in Example 1. The results of measurement and analysis of Example 3 are shown in Table 2 below. It was confirmed that the composition of the metal component included in the ferrite sintered magnet of Example 3 is represented by Formula (1c) above, and the values of 1-w-x-y, w, x, y, z, and m are values shown in Table 1 below. It was confirmed that the ferrite sintered magnet of Example 3 included core-shell structured particles. It was also confirmed that the ferrite sintered magnet of Example 3 included a large number of main phase particles having no core-shell structure. The composition of the inside of the core-shell structured particles in Example 3 was subjected to line analysis along each of the line segments 1 to 4 shown in FIG. 6. Also, in the line analysis of Example 3, the above characteristics 1 to 6 were confirmed in the same manner as in Example 1.

Comparative Example 1

In the case of Comparative Example 1, the raw materials of the main phase were weighed so that the values of 1-w-x-y, w, x, y, z, and m in Formula (1c) above were the values shown in Table 1 below. In the case of Comparative Example 1, the ratio (unit:mass part) of $SiO_2$ to the total mass (100 mass parts) of the raw materials of the main phase was adjusted to the values shown in Table 1 below. In the case of Comparative Example 1, the heating rate, the sintering temperature, and the cooling rate in the sintering step were adjusted to the values shown in Table 2 below.

Figure 3B:
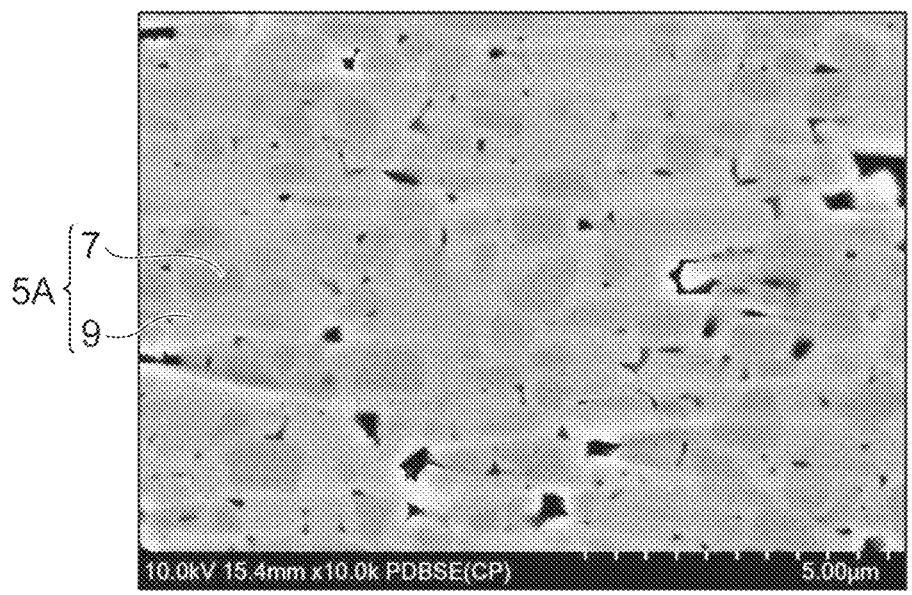
FIG. 3B is an image of a part of a cross section of a ferrite sintered magnet of Comparative Example 1 (cross section taken by the scanning electron microscope)

A ferrite sintered magnet of Comparative Example 1 was produced in the same manner as in Example 1 except for the above matters. In the case of Comparative Example 1, post-addition of the raw materials of the main phase was performed in the pulverizing step, in the same manner as in Example 1. The ferrite sintered magnet of Comparative Example 1 was measured and analyzed in the same manner as in Example 1. FIG. 3B shows an image of the cross section of the ferrite sintered magnet of Comparative Example 1 taken by the scanning electron microscope. The results of measurement and analysis of Comparative Example 1 are shown in Table 2 below. It was confirmed that the composition of the metal component included in the ferrite sintered magnet of Comparative Example 1 is represented by Formula (1c) above, and the values of 1-w-x-y, w, x, y, z, and m are values shown in Table 1 below. It was confirmed that the ferrite sintered magnet of Comparative Example 1 included core-shell structured particles. It was also confirmed that the ferrite sintered magnet of Comparative Example 1 included a large number of main phase particles having no core-shell structure.

TABLE 1

| | Ca 1-w-x-y | La w | Sr x | Ba y | Fe z | Co m | In terms of $SiO_2$ | In terms of $Al_2O_3$ | In terms of $H_3BO_3$ |
|---|---|---|---|---|---|---|---|---|---|
| Unit | Atomic ratio | Atomic ratio | Atomic ratio | Atomic ratio | Atomic ratio | Atomic ratio | Mass part | Mass part | Mass part |
| Example 1 | 0.481 | 0.379 | 0.139 | 0.0007 | 9.40 | 0.22 | 0.67 | 0 | 0 |
| Example 2 | 0.473 | 0.378 | 0.149 | 0 | 9.37 | 0.23 | 0.65 | 0.05 | 0.16 |
| Example 3 | 0.473 | 0.378 | 0.149 | 0 | 9.37 | 0.23 | 0.65 | 0.05 | 0.16 |
| Comparative Example 1 | 0.103 | 0.131 | 0.703 | 0.0026 | 10.50 | 0.11 | 0.52 | 0 | 0 |

TABLE 2

| | Heating rate | Sintering temperature | Cooling rate | R-CS | Br | HcJ |
|---|---|---|---|---|---|---|
| Unit | °C./min | °C. | °C./min | % | mT | kA/m |
| Example 1 | 5 | 1220 | 5 | 25.0 | 457 | 392 |
| Example 2 | 0.5 | 1205 | 10 | 14.3 | 468 | 399 |
| Example 3 | 5 | 1215 | 5 | 21.4 | 472 | 305 |
| Comparative Example 1 | 5 | 1220 | 5 | 64.4 | 441 | 361 |

The ferrite sintered magnet according to the present invention has excellent magnetic characteristics, and thus is suitable for various applications such as motors.

REFERENCE SIGNS LIST

2 Ferrite sintered magnet
2cs Cross section of ferrite sintered magnet
5 Main phase particle
5A Core-shell structured particle
7 Core
9 Shell

What is claimed is:
1. A ferrite sintered magnet comprising a plurality of main phase particles including ferrite having a hexagonal structure,
   wherein some of the main phase particles are core-shell structured particles having a core and a shell covering the core,
   a number of the core-shell structured particles is smaller than a number of the main phase particles other than the core-shell structured particles.

2. The ferrite sintered magnet according to claim 1, wherein a unit of a content of Sr is at. %, and
   a content of Sr in the core is higher than a content of Sr in the shell.

3. The ferrite sintered magnet according to claim 1, wherein a unit of a content of Ca is at. %, and
   a content of Ca in the shell is higher than a content of Ca in the core.

4. The ferrite sintered magnet according to claim 1, wherein a unit of a content of Sr is at. %,
   a unit of a content of Ca is at. %, and
   a content of Sr in the core is higher than a content of Ca in the core.

5. The ferrite sintered magnet according to claim 1, wherein a unit of a content of Sr is at. %,
   a unit of a content of Ca is at. %, and
   a content of Ca in the shell is higher than a content of Sr in the shell.

6. The ferrite sintered magnet according to claim 1, wherein at least a part of a metal component included in the ferrite sintered magnet is represented by Formula (1) below:

$$Ca_{1-w-x-y}R_wSr_xBa_yFe_zCo_m \qquad (1),$$

wherein R in Formula (1) is at least one element selected from the group consisting of rare earth elements and Bi, R includes at least La,
w, x, y, z, and m in Formula (1) satisfy Formulae (2), (3), (4), (5), (6), (7), (8), and (9) below:

$$0.25<w<0.5 \qquad (2);$$

$$0.01<x<0.35 \qquad (3);$$

$$0 \leq y<0.013 \qquad (4);$$

$$y<x \qquad (5);$$

$$8.5<z<9.9 \qquad (6);$$

$$1.0<w/m<2.1 \qquad (7);$$

$$0.017<m/z<0.055 \qquad (8); \text{ and}$$

$$0<1-w-x-y<1 \qquad (9), \text{ and}$$

the ferrite sintered magnet includes a Si component.

7. The ferrite sintered magnet according to claim 6, wherein w, x, and m in the Formula (1) satisfy Formulae (2a), (3a), and (10) below:

$$0.350<w<0.420, \qquad (2a);$$

$$0.120<x<0.180, \qquad (3a); \text{ and}$$

$$0.200<m<0.280, \qquad (10); \text{ and}$$

the content of B in the ferrite sintered magnet is 0.037 to 0.181 mass % in terms of $H_3BO_3$.

8. The ferrite sintered magnet according to of claim 1, wherein a content of Al in the ferrite sintered magnet is 0.05 to 0.3 mass % in terms of $Al_2O_3$.

9. The ferrite sintered magnet according to claim 1, wherein a ratio of a number of the core-shell structured particles to a total number of the main phase particles is more than 0% and less than 50%.

* * * * *